Aug. 23, 1966   F. R. SWANSON   3,268,685
TOASTER CONSTRUCTION
Filed Sept. 18, 1963   4 Sheets-Sheet 1

INVENTOR.
Frank R. Swanson
BY
Leaman, Leaman & McCulloch
ATTORNEYS

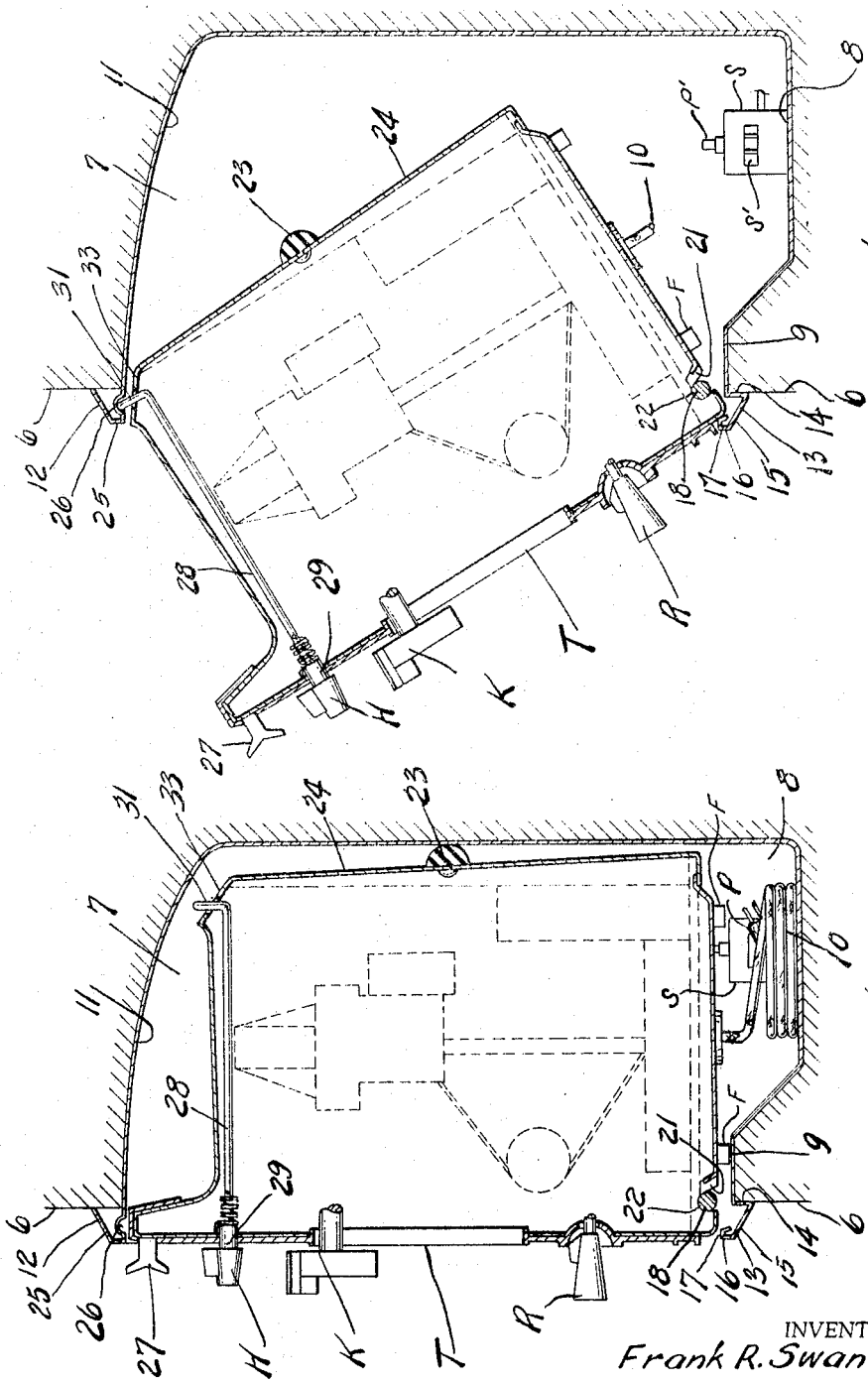

Aug. 23, 1966  F. R. SWANSON  3,268,685
TOASTER CONSTRUCTION

Filed Sept. 18, 1963  4 Sheets-Sheet 3

INVENTOR.
Frank R. Swanson
BY

Aug. 23, 1966  F. R. SWANSON  3,268,685
TOASTER CONSTRUCTION
Filed Sept. 18, 1963  4 Sheets-Sheet 4

INVENTOR.
Frank R. Swanson
BY

United States Patent Office 3,268,685
Patented August 23, 1966

1

3,268,685
TOASTER CONSTRUCTION
Frank R. Swanson, Corunna, Mich., assignor to Swanson
Manufacturing Company, Owosso, Mich., a corporation
of Michigan
Filed Sept. 18, 1963, Ser. No. 309,805
4 Claims. (Cl. 200—61.62)

This application is a continuation-in-part of application Serial No. 175,167, filed February 23, 1962, now abandoned.

This invention relates to a domestic appliance and more particularly to an automatic electric toaster swingably mounted in a recess in the wall or partition in a building, and so mounted as to be swung from a retracted position to a projected position, and return, the toaster having a front wall that is substantially flush with the face of the building wall when the toaster is retracted and which forms a closure for the recess in which the toaster is mounted.

An object of the invention is to provide a swingable toaster which can be recessed in an opening in the wall of a building to provide increased work or counter space in a kitchen when the toaster is not in use, but which can be swung or tilted to a projected position to enable slices of bread to be inserted therein and removed therefrom when desired without hindrance or interference with other objects on counters, tables or other adjacent supports.

Another object of the invention is to provide a tiltable toaster normally accommodated in an upright position in a wall of a building and so mounted as to conceal all but the front wall of the toaster from view, thus conserving counter and work space, and presenting a neat and pleasing appearance.

A further object of the invention is to provide a tiltable toaster having manually operable means for securing it in tilted position to enable slices of bread easily to be inserted and the toast readily removed without utilizing adjacent counter space, and without necessitating shifting of the toaster from one place to another.

Another object of the invention is to provide a tiltable toaster of the character referred to which is self-supporting in either its retracted or projected position.

A further object is to provide a toaster of the class described which is easily mounted in and removed from the wall recess.

Another object of the invention is to provide a built-in or recessed electric toaster construction provided with means for ventilating the recess in which the toaster is mounted, and equipped with means for preventing operation of the toaster when the latter is in its recessed or retracted position.

The invention possesses still further subordinate objects and advantages which will be pointed out specifically or will become apparent from the following description when it is considered in conjunction with the appended claims and the accompanying drawings, in which:

FIGURE 3 is a transverse sectional view illustrating the recess in the wall and the toaster mounted in an upright position therein;

FIGURE 4 is a view similar to FIGURE 3, but showing the toaster swung to its projected position;

2

Figure 2:
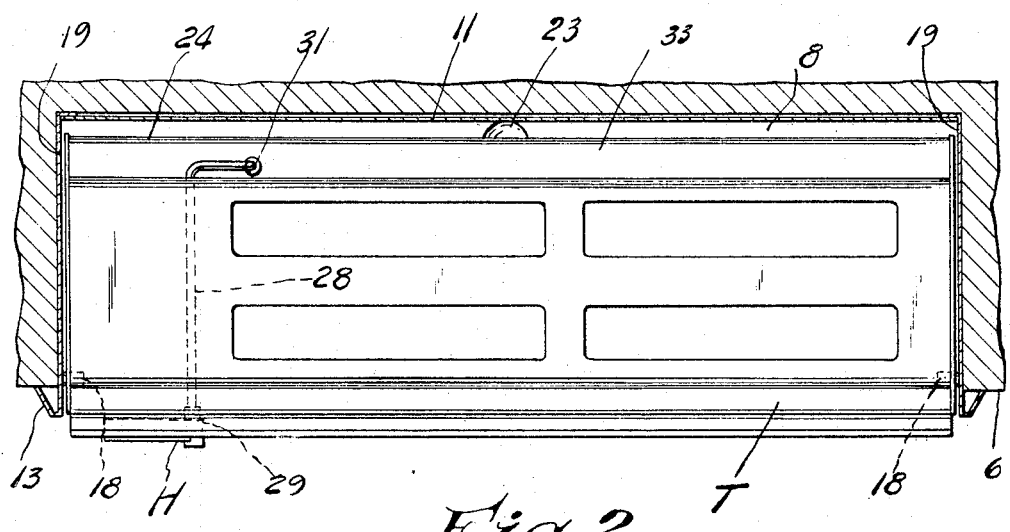
FIGURE 2 is a view partly in section and partly in top plan view.
Figure 1:
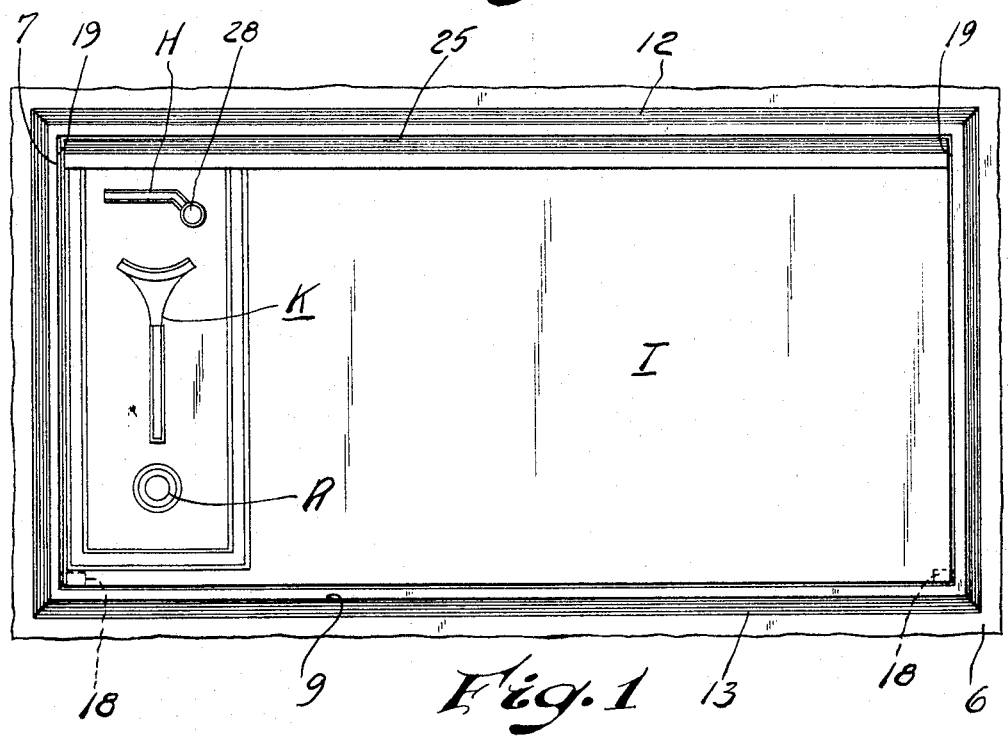
FIGURE 1 is a fragmentary, front elevational view of a recessed toaster constructed in accordance with one embodiment of the invention.
Figure 5:
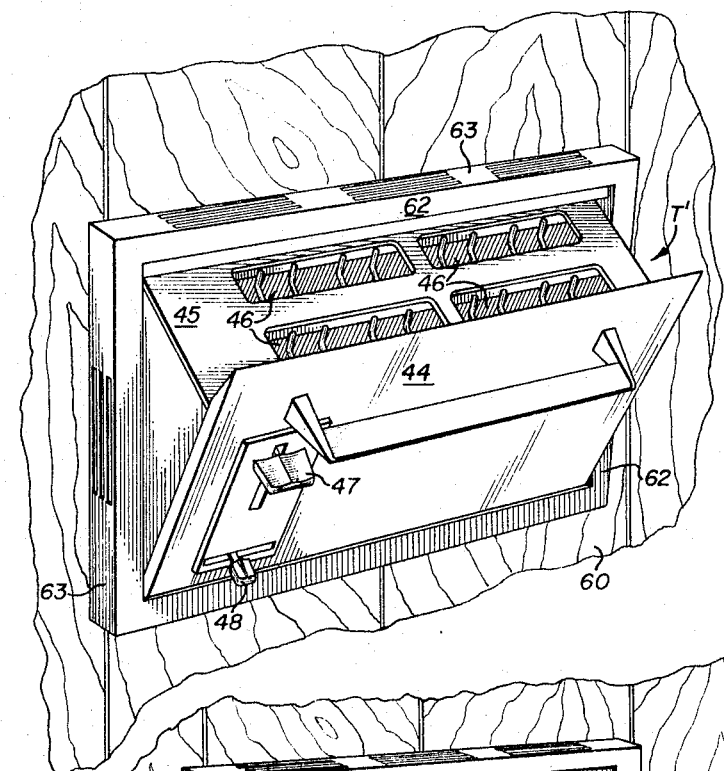
FIGURE 5 is a fragmentary, perspective view of a modified form of the invention and illustrating the toaster in its projected position.
Figure 6:
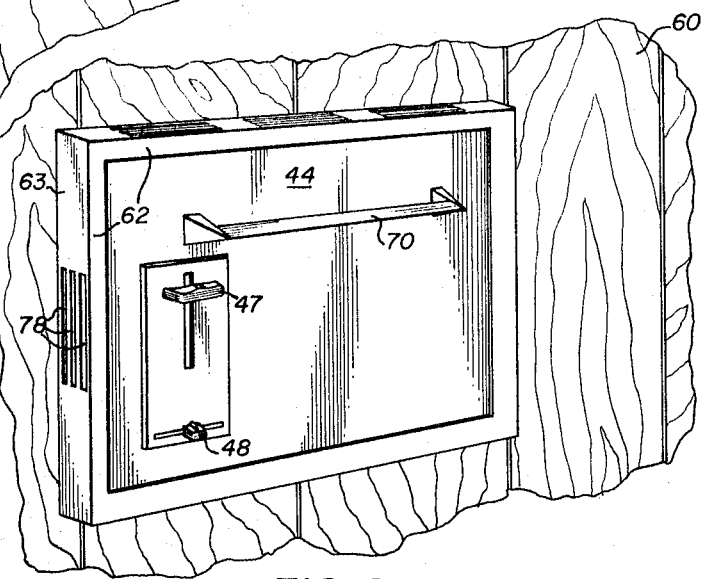
FIGURE 6 is a view similar to FIGURE 5, but showing the toaster in its retracted position.
Figure 7:
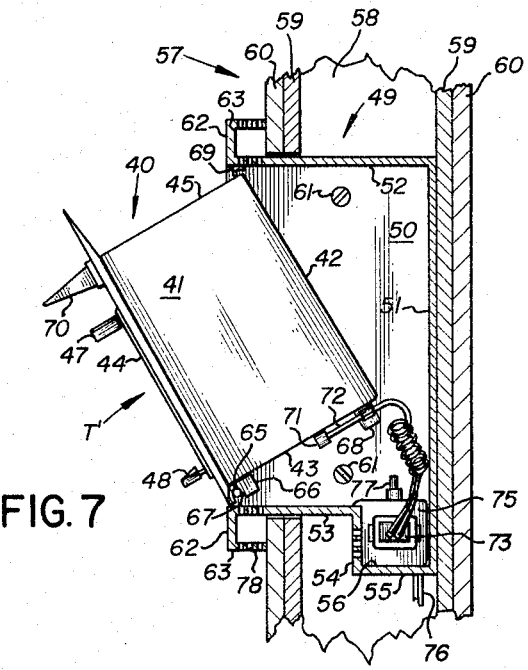
Figure 8:
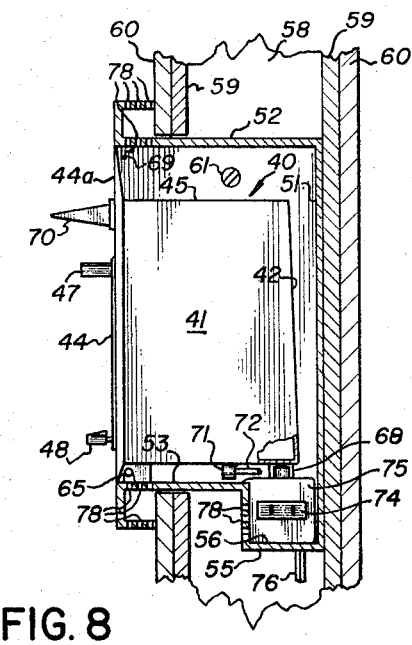

FIGURES 7 and 8 are transverse sectional views respectively illustrating the toaster in its projected and retracted positions.

The embodiment of the invention shown in FIGURES 1–4 is adapted for mounting at a suitable level in a recess 7 formed in a vertical wall 6. The inner or rearward lower portion 8 of the recess is depressed and lies below a horizontal wall 9 extending across the front of the recess to form a well or depression to accommodate a switch box S and the conventional electric cord 10 which is connected at one end to the heating elements (not shown) of the toaster. The usual plug P is provided at the free end of the cord for connection to a socket S' provided in the switch box S so as to connect the heating elements of the toaster to the usual house current.

The recess may have a suitable metallic or other fireproof lining 11, the top and bottom edges 12 and 13 of which are formed to extend beyond the building wall to frame the opening 7. The upper edge 12 of the lining also serves to limit the swing or range of outward tilting movement of the toaster T, as will be pointed out in greater detail hereinafter. The lower edge of the lining 11 is bent downwardly against the face of the wall 6 as at 14, and is thence pitched upwardly as at 15. The member 15 is joined to an upright section 16 that is bent inwardly and downwardly as at 17, for a purpose presently to be described.

Transversely extending fulcrum pins 18 are provided in the opposed end walls 19, 19 of the liner 11 adjacent the open side of the recess 7 and project a short distance into the recess toward one another. The bottom wall of the toaster T is cut and bent adjacent each end as at 21 to form a passage or open bearing 22 of a size and shape to accommodate the projecting ends of the pins 18. Also provided on the bottom wall of the toaster are front and rear supporting feet F which may support the toaster in an upright position on any flat surface.

When the toaster is mounted in the recess, its forward end is rockably supported on the pins 22. In the position of the toaster shown in FIGURE 3, gravity exerts a constant force on the toaster tending to rock it clockwise. The toaster may be stabilized by a bumper 23 provided on the rear wall 24 to engage and space the toaster from the rear wall of the recess and minimize jar and shock should the toaster be accidentally released and unrestrained when swinging into the recess from the projected position shown in FIGURE 4. A knob member 27 is fixed at the upper end of the front wall of the toaster to facilitate swinging the latter to either its projected or retracted position.

The upper, front wall of the lining 11 also projects beyond the face of the building wall 6 and is shaped to form a hood 25 having a downwardly concave groove 26 in its lower face. The height of the recess adjacent its open side is substantially greater than the height of the rear wall of the toaster, thereby assuring sufficient space to permit rocking of the toaster about the axis provided by the pins 18. The front wall of the toaster corresponds substantially to the height of the open side of the recess so as to cover the latter between the members 16 and 26 when the toaster is in its retracted position.

Latching means is provided on the toaster for releasably latching it in its projected or outwardly tilted position and comprises a transversely disposed, spring tensioned shaft 28 journaled at one end in a bearing 29 provided in the front wall of the toaster. The other end of the shaft is bent laterally and then vertically at right angles to form a latch bolt 31 that is adapted to extend through an opening provided in an angularly disposed, upper rear section 33 of the toaster frame. A torsion spring 30 having one of its ends fixed to the front wall of the toaster and its other end fixed to the shaft 28 constantly urges the latching leg to its latching or projected position. At the other end of the shaft 28 is fixed an operating knob H which may be rocked to swing the member 31 into an out of engagement with the recess 26 to latch the toaster in projected position, or release it for swinging back into the recess.

The toaster is provided with electric heating elements (not shown) of conventional construction which form no part of the present invention per se. The heating elements lie on opposite sides of bread accommodating openings formed in the top wall of the toaster, as is conventional. Between the heating elements are bread supporting trays (not shown) which are vertically adjustable to raise and lower bread slices relatively to the toaster. A knob K extends through the face of the toaster T for actuating such trays to raise and lower the slices of bread and an adjustable regulator handle R is also provided on the face of the toaster for regulating the toasting cycle to control the toast color.

The mounting of the toaster in the recess is accomplished by tilting it to substantially the position shown in FIGURE 4, and inserting it in the recess while tilted.

The lower front edge of the toaster may be supported on the strip 17 to locate the toaster in such position as to enable the pins 18 to enter the passages 21 and be accommodated in the bearings 22. Thereafter, the toaster may be swung upwardly into the recess 7 where it will remain in its retracted position until its use is desired. If the toaster is to be used in its wall mounted position, the electric cord should be plugged into the socket S′ prior to mounting the toaster in the recess. The cord will then be located in the depressed area 8 and offer no interference to the retraction of the toaster.

When it is desired to use the toaster, it may be swung to, and latched in, the projected position shown in FIGURE 4. In this position of the toaster bread slices may be inserted in and withdrawn from the toaster in the usual manner. Alternatively, the toaster may be removed from the wall recess and used in any other place.

To prevent inadvertent heating of the toaster heating elements when the toaster is in its recessed or retracted position, the switch box S preferably is provided with an upstanding, normally projected switch plunger P′ which is engaged and depressed by the bottom wall of the toaster when the latter is swung to its recessed position. Depression of the plunger P′ will disconnect the switch box from the source of electrical energy, thereby making it impossible to effect heating of the toasting elements when the toaster is retracted.

The embodiment of the invention disclosed in FIGURES 5–8 is generally similar to the earlier described embodiment, but differs from the latter in certain respects. In FIGURES 7 and 8, an electric toaster T′ is disclosed as comprising a metal body 40 having opposite end walls 41, a rear wall 42, a bottom wall 43, a front wall 44, and a top wall 45 having a plurality of slots 46 (FIGURE 5) in which slices of bread may be accommodated between confronting electric heating elements (not shown). As is conventional, each slice of bread may be supported on a vertically movable shelf (not shown) which may be raised and lowered under the influence of a lever having a handle 47 which protrudes through the front wall 44 of the toaster. The toasting cycle is controlled by a conventional rheostat (not shown) that may be regulated by an operating lever 48 that also projects through the front wall of the toaster.

The toaster T′ is adapted for removable mounting in a metal or other fireproof liner 49 having opposite end walls 50, a rear wall 51, a top wall 52 and a bottom wall 53, the rear end of the latter terminating in a downwardly extending portion 54 that is joined to a horizontal web 55 which connects with the rear wall 51 to form a well or recess 56.

The liner 49 is adapted to be mounted in an opening or recess formed in a building wall 57. The walls of most residences are constructed of vertical studs 58 that are spaced apart from one another a distance of about 16 inches, and the studs are faced on opposite sides with coats of plasterboard 59 to which is adhered an outer coating of plaster or paneling 60. The liner-accommodating recess may be formed by cutting through the plasterboard and outer coating at one side of the studs 58 and between two adjacent studs. The end walls 50 of the liner may be provided with openings for the accommodation of screws 61 which may be utilized to secure the liner between two adjacent studs 58.

Preferably, the top, bottom and end walls of the liner 49 project beyond the outer surface of the wall in which it is mounted and are provided with laterally turned flanges 62 that terminate in rearwardly turned flanges 63 which surround and frame the wall opening.

The toaster T′ is adapted to be mounted within the liner 49 for tilting movements about a fulcrum from a retracted position to an outwardly projected position. Alternatively, the toaster T′ is adapted to be removed bodily from the wall recess and liner for use in any other location. Means for mounting the toaster in this manner comprises a pair of opposed pins 65 located adjacent the open side of the liner and near the bottom wall 53, each pin 65 extending a short distance into the recess toward the other. Fixed to the bottom wall 43 of the toaster body is a pair of spaced apart supporting feet 66, each of which has a slot 67 formed therein for the accommodation of the associated pin 65. Adjacent the rear end of the toaster body its bottom wall 43 is provided with a second pair of supporting feet 68 which cooperate with the feet 66 to support the toaster in an upright position on any flat surface.

As is best indicated in FIGURE 8, the top wall 45 of the toaster body is spaced a substantial distance below the top wall 52 of the liner 49 when the toaster is in its retracted position in the liner. Such space may be obscured from view when the toaster is retracted by an extension 44a on the front wall 44 of the toaster and which is of such height as to enable the front wall of the toaster to fit closely within the open side of the liner. The spacing between the top walls 45 and 52 should be such as normally to permit tilting movement of the toaster from the retracted position shown in FIGURE 8 outwardly about the axes of the pins 65 and permit the toaster to clear the top wall 52 of the liner. In order to prevent removal of the toaster from the liner, except when such removal is desired, the top wall 52 of the liner is provided adjacent its open side with a stop or latching bar 69 which lies in the path of and engages the rear edge of the top wall 45 of the toaster when the latter has been rocked to its projected position as is shown in FIGURE 7. When the toaster has been rocked to its projected position, the center of gravity of the toaster will have been shifted from a position inwardly of the fulcrum pins 65 outwardly thereof, so that the toaster tends to remain in its projected position.

If it should be desired to remove the toaster from the liner cavity, it is necessary only to tilt the toaster inwardly from its projected position a distance sufficient to enable the toaster to be lifted bodily to a level which permits the pins 65 to be removed from the slots in the feet 66. Ample space is provided between the walls 45 and 52 to accomplish such movement of the toaster. Thereafter, the toaster may be withdrawn directly from the liner and be supported in an upright position on any flat surface. Tilting movements and removal of the toaster are facilitated by a handle 70 that is secured to the front wall of the body 40.

The electrical heating elements of the toaster are connected to a fitting 71 that is fixed to the bottom wall 43 of the toaster body. To the fitting 71 is connected one end of an electrically conductive cord 72, the other end of which is joined to a conventional plug 73. The plug 73 is adapted removably to be inserted in a socket 74 provided in a switch body 75 that is mounted in the liner recess 56 in a position to lie between the supporting feet 68. The switch body may be connected by suitable concealed wiring 76 to a source of electrical energy.

In the preferred arrangement, the electrical heating elements of the toaster are enabled to operate only when the toaster is in a projected position and are disabled from operating when the toaster is in its retracted position. This operation may be assured by providing a spring pressed, switch operating plunger 77 in the switch body 75 and locating the plunger 77 in the path of tilting movement of the toaster body toward its retracted position. The arrangement is such that retraction of the toaster causes the plunger 77 to be retracted against the bias of its spring, thereby disabling current from being supplied to the toaster's heating element. Rocking of the toaster to its projected position enables the spring to project the switch plunger 77 thereby permitting operation of the heating elements.

It is commonly known that the heating elements of toasters are heated to rather high temperatures during a toasting operation and that the toaster body absorbs and retains for a limited period a substantial amount of this heat. In order to dissipate such absorbed heat as quickly as possible, even if the toaster should be moved to its retracted position immediately following a toasting cycle, numerous vent slots 78 are provided in the walls of the liner 49 and through which air may circulate to cool the toaster body and the liner.

The disclosed embodiments are representative of presently preferred forms of the invention, but are intended to be illustrative rather than definitive thereof. The invention is defined in the claims.

I claim:

1. An electric toaster or the like mounted in a walled recess and adapted for connection to a source of electrical energy, said toaster comprising a body having a top wall provided with at least one opening therein for the accommodation of a bread slice; separable, cooperable fulcrum means on said body and in said recess and mounting said body for rocking movements in a path from a retracted position in which said body is in an upright position and said opening is located within said recess, to a projected position in which said body is inclined upwardly and outwardly of said recess a distance sufficient to locate said opening outwardly of said recess, and return; stop means located in the path of movement of said body toward said projected position; limit means supported by said body and engageable with said stop means to prevent movement of said body outwardly of said recess beyond said projected position; electrically conductive means for connecting said toaster to said source; and switch means in circuit with said conductive means and supported in said recess in the path of movement of said body toward said retracted position for engagement by said body, engagement of said switch means and said body disabling electrical connection of said toaster and said source, said cooperable fulcrum means and said stop means and said limiting means being respectively disengageable from one another to enable bodily removal of said body from said recess.

2. The apparatus set forth in claim 1 including support means on said body for supporting the latter in an upright position when said body is removed from said recess.

3. The apparatus set forth in claim 2 wherein the fulcrum means on said body is constituted in part by said support means.

4. The apparatus set forth in claim 1 wherein said recess has a base of such depth as to provide space for the accommodation of said conductive means.

References Cited by the Examiner

UNITED STATES PATENTS

| | | | |
|---|---|---|---|
| 2,504,445 | 4/1950 | Pavnica | 99—393 |
| 2,693,141 | 11/1954 | Johnson et al. | 99—239 X |
| 2,850,613 | 9/1958 | McCormick | 219—444 |
| 3,038,629 | 6/1962 | Morton | 220—18 |

BERNARD A. GILHEANY, *Primary Examiner.*

HARRISON R. MOSELEY, *Examiner.*

K. DOWNEY, B. DOBECK, *Assistant Examiners.*